May 4, 1954  E. V. BUNTING  2,677,322
POWER-OPERATED SYSTEM FOR TRACTORS
Filed June 16, 1949  3 Sheets-Sheet 1

INVENTOR.
ERNEST V. BUNTING
BY Carlson, Pitzner,
Hubbard & Wolfe
ATTORNEYS

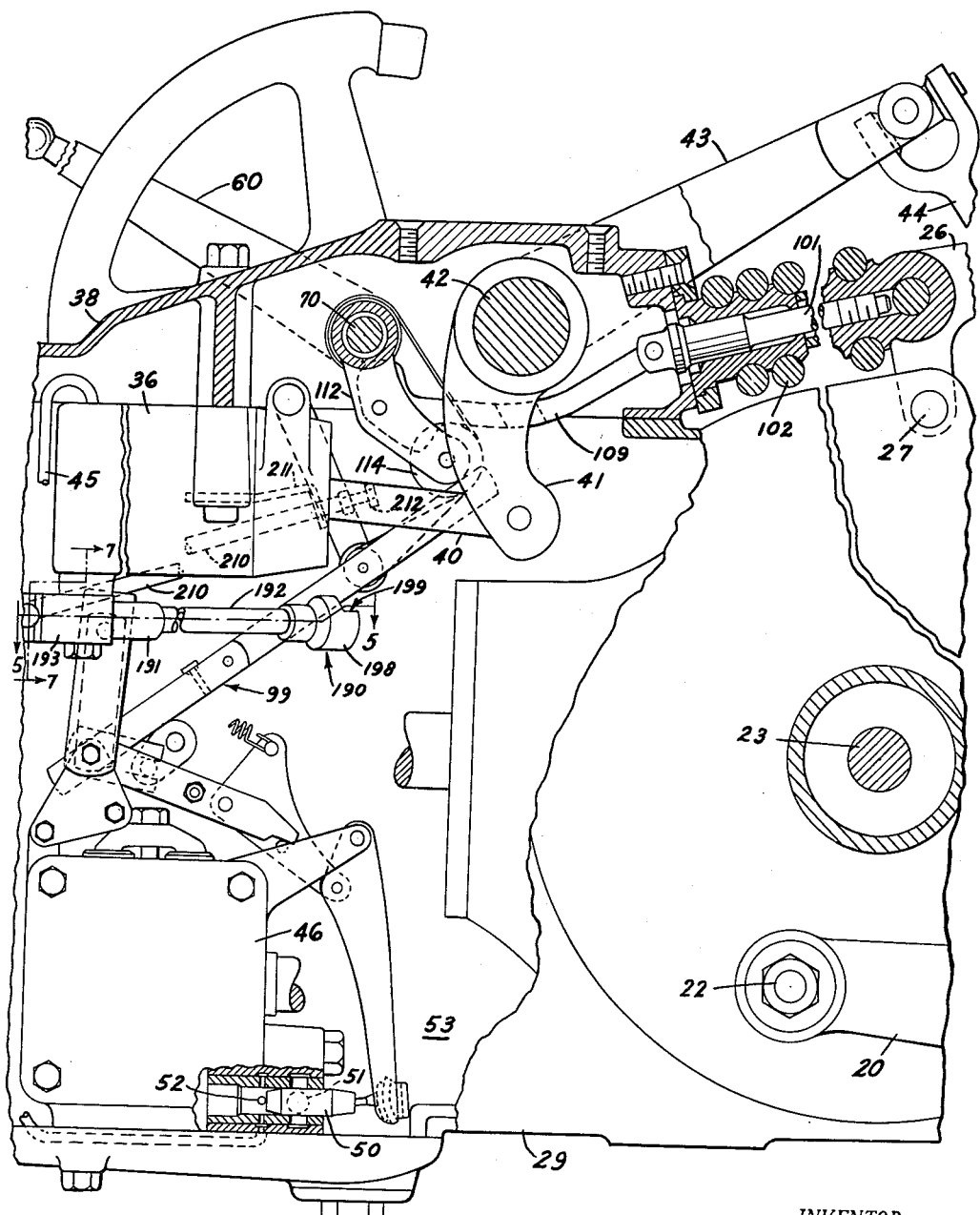

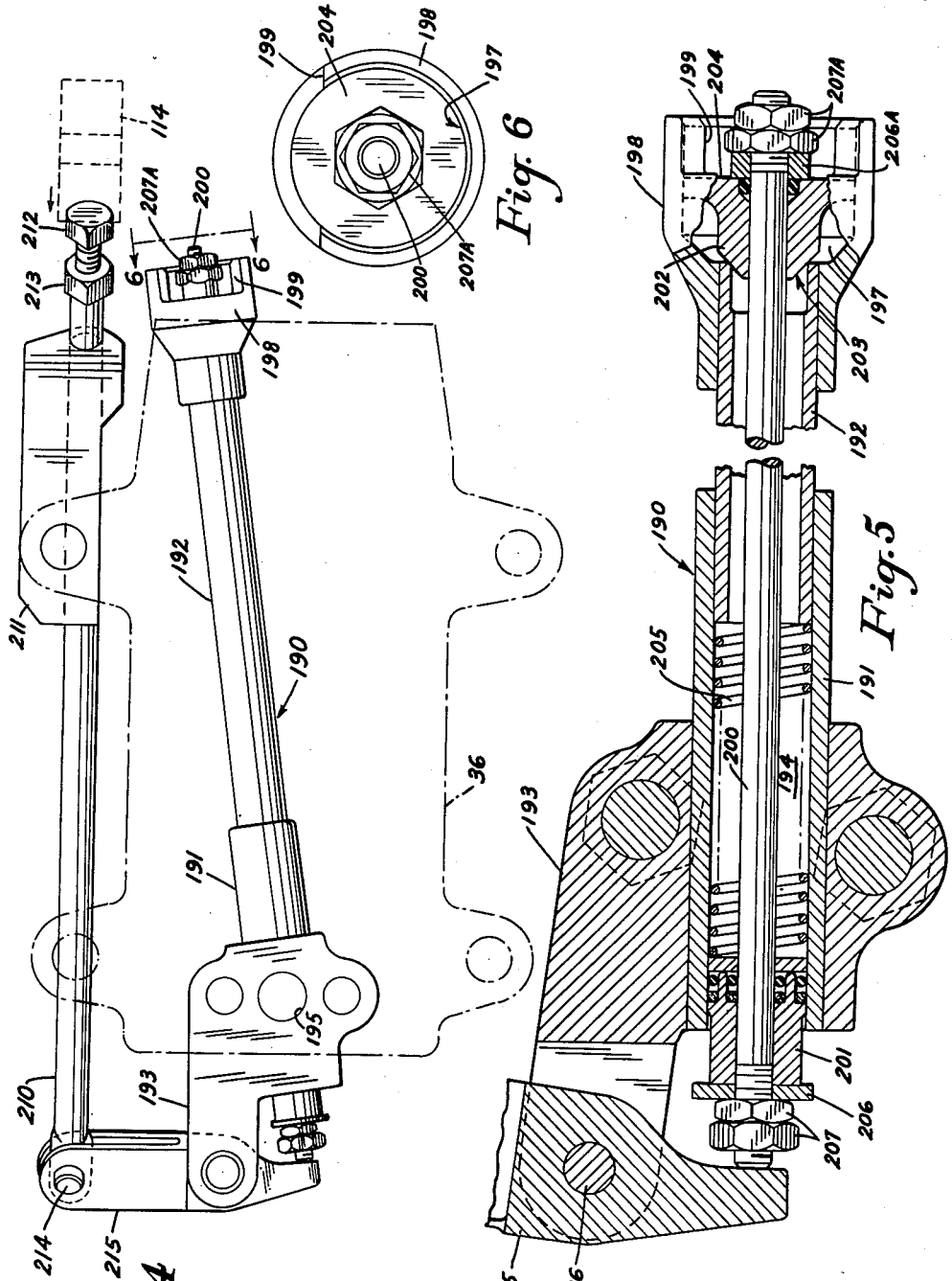

Patented May 4, 1954

2,677,322

UNITED STATES PATENT OFFICE 2,677,322

POWER-OPERATED SYSTEM FOR TRACTORS

Ernest V. Bunting, Detroit, Mich., assignor to Harry Ferguson, Inc., Detroit, Mich., a corporation of Delaware Application June 16, 1949, Serial No. 99,546

17 Claims. (Cl. 97—46.07)

The invention relates to improvements in the control of power-operated systems for tractor hitch linkages and it is more particularly concerned with control mechanism for temporarily disabling the power system when the hitch linkage is subjected to an excessive draft force or overload, as when the attached implement encounters an obstruction.

The invention is particularly well adapted for use on tractors equipped with the well-known "Ferguson System" for maintaining a tractor-carried implement at a substantially constant working depth and for transferring the implement weight to the driving wheels of the tractor. The basic system of this type, as shown in the Ferguson Patent No. 2,118,180, issued May 24, 1938, utilizes a pressure fluid operated actuator for raising and lowering the hitch linkage to effect the necessary adjustments for implement depth and weight transfer. Operation of the system is automatically controlled by valve means operated in accordance with the draft load imposed on the hitch linkage to admit pressure fluid to or allow it to exhaust from the actuator.

When an implement carried by a tractor equipped with the hitch linkage of the Ferguson system strikes an obstruction, such as a buried root or a rock, the excessive draft on the hitch linkage acts to open the main valve to exhaust fluid from the actuator and thus relieve the tractor driving wheels of the weight of the implement. Accordingly, the wheels may spin or slip, thereby preventing damage to the implement or the hitch linkage. A system of this general character is disclosed in the Ferguson Patent No. 2,118,181, although in that particular instance relief is effected by also forcing open an additional valve. It has been found, however, that with such overload release arrangements the tractor has a tendency to "buck" or "shudder" following such release. This is for the reason that when the tractive effort is reduced, the valve means resets itself so as to again transfer the implement weight to the driving wheels and thus cause a repetition of the cycle as above described. Moreover, this bucking effect is exaggerated when the tractor has pneumatic tires on the rear wheels, as is usually the case. The heavy loading just prior to release makes the tractor "squat" and then with ensuing sudden release, the load on the tires is relieved so that the tractor rear end springs up. Rapid repetition of those effects can be uncomfortable for the driver.

In an effort to overcome the above difficulties, it has been proposed to provide a mechanical latch means for latching the valve means in overload release position. A latch arrangement of this character is disclosed in the Ferguson Reissue Patent No. Re. 22,642, reissued May 15, 1945.

With the above in view, the primary aim of the present invention is to provide an improved overload release mechanism adapted to respond very quickly and surely when the load even slightly exceeds a predetermined value and which—and this is most important—thereafter maintains the power system ineffective. In that way it effectually eliminates bucking of the tractor and without the use of any mechanical latch means in the system.

Another object is to provide an improved overload release valve for tractor power systems in which the means for maintaining the system inoperative after an emergency release is incorporated directly in the valve structure.

It is also an object of the invention to provide overload release means for tractor power systems which is simple in construction, which occupies a minimum of space, and which can be readily incorporated in the transmission housing of Ferguson tractors of the form now on the market without requiring any substantial changes or modifications therein.

Other objects and advantages of the invention will become apparent from the following detailed description of the preferred embodiment illustrated in the accompanying drawings, in which:

Fig. 3 is a vertical section through the transmission housing of the tractor, showing the elements of the power-operating system and associated controls, including the overload release mechanism of the invention.

Fig. 4 is a plan view of the release valve and its associated actuating mechanism.

Fig. 5 is a longitudinal sectional view of the release valve taken in offset horizontal planes substantially on the line 5—5 of Fig. 3.

Fig. 6 is an end view of the release valve taken in a plane substantially on the line 6—6 of Fig. 4.

For purposes of illustration, a preferred embodiment of the invention has been shown and will be described in detail herein. It is not intended that the detailed character of the disclosure should limit the invention to such particulars, but on the contrary, it is intended to cover all modifications and alternative constructions falling within the spirit and scope of the invention as expressed in the appended claims.

Figure 1:
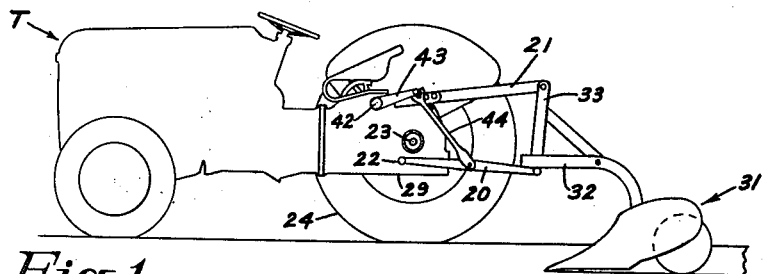
Figure 1 is a side elevational view of a tractor equipped with a power-operating system and emergency release embodying the features of the invention, with a typical implement attached to the hitch linkage and shown occupying its normal working position.
Figure 2:
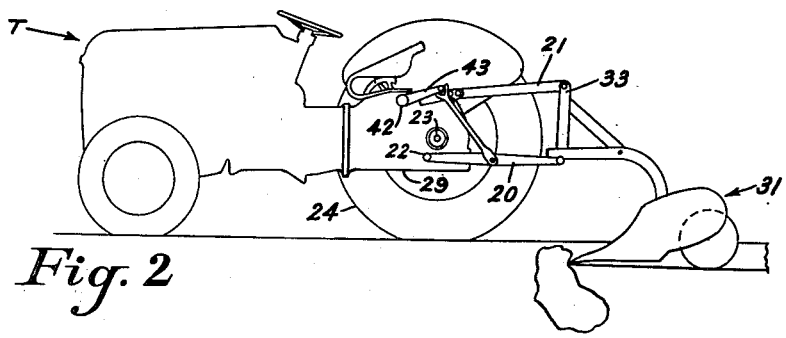
Fig. 2 is a view similar to Fig. 1, showing the implement encountering an obstacle.

Referring to the drawings, there is shown in Fig. 1 a lightweight four-wheeled tractor T similar to that disclosed in the Ferguson Patent No. 2,118,180 above referred to. At the rear end of the tractor is mounted a hitch linkage of the type shown in that Ferguson patent comprising, in this instance, a pair of lower hitch links 20 and a top link 21.

The lower hitch links 20 are arranged side by side and converge forwardly. Their front ends are pivotally secured at 22 on the rear end portion of the tractor for vertical swinging movement about a transverse horizontal axis located below and slightly forward of the rear axis of the rear axle 23 upon which the tractor's pneumatically-tired rear traction or drive wheels 24 are mounted. The pivots 22 permit lateral swing of the hitch links 20 as well as vertical swinging movement.

The top link 21 is secured for universal pivotal movement at its forward end to the rearwardly projecting arm of a rocker or clevis 26 pivoted as at 27 on the tractor differential housing 29 at the rear of the tractor. Forward thrust on the top link 21 tends to swing the rocker 26 forward while relief of pressure on the top link tends to permit it to retreat rearward under the thrust of a suitable control spring.

In the present instance and simply by way of example a conventional plow 31 has been shown attached to the hitch linkage. The plow has the usual beam 32 which is secured to the draft links 20. An upstanding bracket 33 rigid with the beam is secured to the top link 21.

Raising and lowering of the hitch links 20 and the implement 31 is effected by power-operated means, in this instance in the form of a hydraulic power unit mounted on the tractor and preferably enclosed within the tractor housing just forward of the differential. The power unit includes an actuator, herein shown as a one-way ram comprising a cylinder 36 (Fig. 3) bolted or otherwise removably secured to a removable cover plate 38 which forms a part of the top wall of the housing 29. The cylinder 36 opens to the rear of the tractor and working therein is a piston having a rod 40 which projects rearwardly. The ball-shaped outer end of the piston rod 40 is received in the socketed lower end of an arm 41 rigid with a transverse rockshaft 42 journaled in the upper rear portion of the cover plate 38.

Rigidly secured at opposite ends of the rockshaft 42, as by a splined connection, are two upwardly and rearwardly extending crank arms 43 connected to respective ones of the hitch links 20 by means of drop links 44. With this arrangement the admission of pressure fluid to the forward end of the cylinder 36 forces the piston rearwardly to rock the crank arms 43 upwardly and thereby raise the hitch links 20. Upon exhaust of fluid from the cylinder 36 the piston is permitted to retreat into the cylinder under the urge of the gravity load on the hitch links and any implement attached to those links so that the latter swings downwardly in a lower direction.

Pressure fluid such as oil is supplied to the actuator or ram cylinder 36 by way of a conduit 45 from a pump 46 powered from the tractor engine. Supply of fluid to and exhaust from the ram cylinder for raising and lowering the hitch linkage is controlled by means of a valve means associated with the intake side of the pump. In the exemplary system the valve means comprises a single sliding valve plunger 50 (Fig. 3) arranged to control a set of intake ports 51 for the pump 46 and a set of bleed or drop ports 52 communicating with the conduit 45 leading to the ram cylinder 36.

Operation of the control plunger 50 is effected through suitable control mechanism, including a hand lever 60, conveniently called the quadrant lever, and a control member 101 variably positioned in accordance with the draft force on the hitch linkage. While the present invention is adapted for use with various types of control mechanism, the mechanism shown by way of illustration corresponds to that disclosed in my copending application Serial No. 97,640, filed June 7, 1949. The construction and mode of operation of this mechanism is fully described in the said copending application to which reference may be had. For present purposes it is sufficient to note that the control member 101 is in the form of an elongated axially shiftable plunger and is associated with the rocker member 26 and a control spring 102 in a manner such that it will be displaced inwardly a predetermined distance by an overload in the draft load or horizontal resistance to movement of the implement attached to the hitch linkage. In the mechanism of my copending application the displacement of the plunger to the overload position is beyond the normal range of movement thereof in response to draft forces when the mechanism is set for automatic draft operation. When the mechanism is set for "position control" instead, the plunger will simply operate the system when an overload is encountered.

In the operation of the tractor, shifting of the control member 101 through a normal range acts through a linkage 99 to operate the valve plunger 50 and thus cause the actuator 36 to lift or lower the hitch linkage so as to maintain a substantially uniform draft load thereon as determined by the setting of the quadrant lever 60. The emergency or overload release mechanism constituting the subject-matter of the present invention is arranged for operation in response to the movement of that control member by a force in excess of a predetermined maximum. In the Ferguson system draft control this maximum is a force that moves the control member beyond such normal range. More particularly, the movement of the control member 101 is utilized to initially open or "crack" a normally closed valve 190 which forms a part of the overload release mechanism and which is associated with the actuator cylinder 36 and is effective to vent the same when opened.

In accordance with the invention the valve 190 is constructed and arranged so that even a small initial opening is effective to bring about immediate full opening of the valve even though the fluid pressure in the system is quite low and thus substantially instantaneous and complete venting of the actuator cylinder. The valve 190 is further characterized by the built-in means for retaining it in open position until some positive action is taken by the tractor operator to interrupt the delivery of pressure fluid to the actuator. In other words, the valve is retained in open position and continues the venting of the actuator, thus terminating the lifting or supporting effectiveness of the power-operated system so as to prevent any further effort thereof on the hitch linkage until the supply of pressure fluid to the actuator has been interrupted. This affords ample time for the tractor operator to take the necessary steps preliminary to clearing the implement from the obstruction without "bucking" or "shuddering" of the tractor. Thus the operator will have ample time to stop the pump 46 by disengaging its driving clutch, lower the quadrant lever to reset the controls and then back the tractor and implement while raising the implement in the usual way to clear the obstruction.

Referring more particularly to Figs. 4 and 5 of the drawings, the release valve 190 as herein shown comprises an elongated housing formed in this instance by two tubular members 191 and 192 of different internal diameters assembled with one end of the smaller member telescopically engaged in the adjacent end of the other member. The tubular members thus define a valve chamber 194 having two sections one of which has a cross-sectional area substantially greater than the other.

Figure 7:
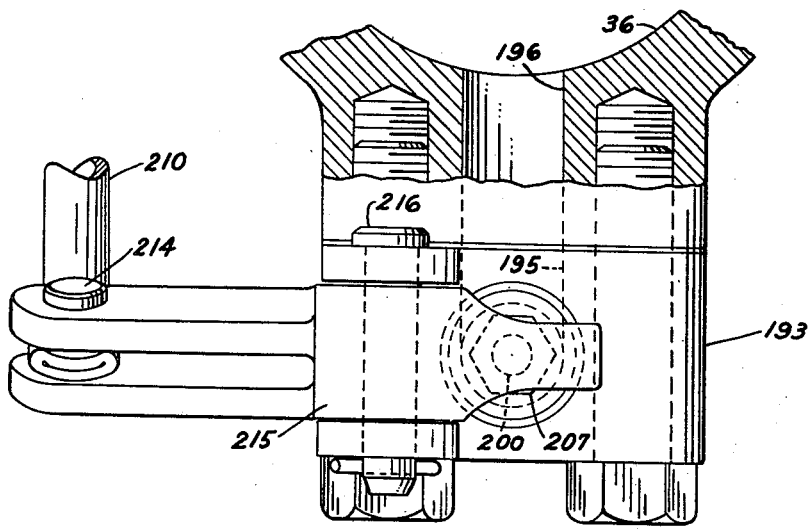
Fig. 7 is a sectional view taken in offset vertical planes substantially on the line 7—7 of Fig. 3.

The outer end of the larger housing member 191 is received in a hollow bracket 193 bolted or otherwise secured to the underside of the cylinder 36 adjacent its forward end whereby the valve is supported below and in substantially parallel relation to the cylinder. To operatively associate the valve with the actuator, the larger end of the valve chamber 194 communicates with the actuator cylinder 36 by way of connecting passages 195 (Fig. 7) in the member 191 and bracket 193 and a port 196 opening from the forward end of the cylinder. The smaller end of the valve chamber 194 opens into an auxiliary chamber 197 (Figs. 5 and 6) formed in a bell-shaped fitting 198 suitably secured to the member 192. This auxiliary chamber is of substantially greater cross-sectional area than the larger section of the valve chamber 194 and has a lateral opening port 199 formed by cutting away part of the side wall of the fitting 198.

Extending through the valve chamber 194 is an elongated stem 200 fitted at one end with a piston 201 working in the larger section of the valve chamber. At the other end the stem is fitted with a valve member or head 202 having its inner end beveled to provide a generally conical surface 203 adapted to seat against the adjacent end of the tubular member 192 to close the valve chamber 194 from the auxiliary chamber 197. The other or outer end of the valve member 202 is formed with an enlarged piston or valve element in the form of a circumferential flange 204 having a working fit in the auxiliary chamber 197 and operative to regulate the effective area of the vent port 199. The position of the flange 204 is such that the vent port is closed as the valve member 202 approaches seating engagement with the valve casing and the port is opened progressively as the valve member moves outwardly from the casing. It will be understood of course that suitable packing is provided for both the piston 201 and the valve member 202 to prevent leakage of high pressure fluid when the valve is closed.

A light coil spring 205 interposed between the end of the tubular member 192 and the adjacent end of the piston 201 urges the latter outwardly from the valve chamber or toward the left as viewed in Fig. 5. Such movement is transmitted to the valve stem 200 through a stop washer 206 and lock nuts 207 threaded on the end of the stem. A stop washer 206ᵃ and stop nuts 207ᵃ threaded on the other end of the stem restrict movement of the valve member 202 relative thereto.

Since the actuator cylinder 36 and valve chamber 194 are in direct communication, the inner face of the piston 201 and the exposed inner face of the valve member 202 are subjected to the full pressure of the fluid in the hydraulic system. The piston 201 of course has a substantially greater effective area than the valve member 202 and consequently the valve assembly will be urged in a direction to effectually seal the valve chamber.

Upon movement of the valve assembly in the other direction, unseating of the valve member 202 from the casing member 192 will permit a flow of pressure fluid from the valve chamber 194 into the auxiliary chamber 197. Pressure exerted by this fluid against the relatively large effective area of the piston element or flange 204 is operative to overcome the force exerted on the piston 201 and the valve assembly is therefore quickly shifted toward its full open position. Element 204 then acts as a valve for the vent port 199 which is opened so as to vent the fluid from the ram substantially instantaneously.

As pressure in the system drops, the valve member 202 and valve element 204 move toward the closed position under the urging of the spring 205, but so long as any fluid is supplied to the actuator cylinder and the valve chamber 194, the force exerted on the element 204 will retain the valve member 202 substantially in full open position. It may be noted that chips or other foreign matter cannot become lodged in between the member 202 and its seat to cause malfunctioning of the valve. The flow of fluid through the vent port 199 will be restricted slightly due to the relatively small force exerted on the valve assembly by the spring 205. However, the fluid flow from the valve will be in such volume as to prevent the establishment of an operative pressure head in the actuator cylinder 36 even though the control valve 50 is set to supply fluid to the actuator cylinder. Accordingly, the actuator under any kind of a load will be maintained inoperative until the supply of pressure fluid is interrupted so as to allow the spring 205 to close the valve.

A very important feature of the release valve is the arrangement for preventing closure or resetting of the valve upon a momentary pressure drop occurring after an overload release action and before the implement has been cleared from the obstruction. For this purpose, the seat portion 203 of the valve member 202 and the flange or valve element 204 are spaced apart so that in the movement of the valve assembly toward the closed position, vent port 199 is effectively closed before the member 202 is seated. Fluid trapped in the auxiliary chamber 197 by closure of the port 199 escapes relatively slowly around the element 204, thus providing a dashpot action which slows down further movement of the valve assembly to fully closed position. If the momentary pressure drop is due to a quick opening and closing of the exhaust port at the main control valve, the release valve will not snap shut but will still move slowly toward closed position because fluid escape from the release valve structure through the main valve will be due to the force of the weak spring 205. This delay is sufficient to prevent closure of the valve member 202 and premature resetting of the release valve.

When incorporated in a system of the type disclosed, the initial opening or "cracking" of the valve 190 is effected through the medium of a push rod 210 (Figs. 3 and 4) supported for endwise sliding movement by a bracket 211 at one side of the actuator cylinder 36 with one end projecting at the rear of the cylinder. The projecting end of the push rod is positioned for engagement by a sheave or roller 114 carried by a pivoted rocker arm 112 connected by a link 109 with the control member or plunger 101. When an overload is imposed on the hitch linkage the control member is shifted beyond its normal range as before explained, thereby swinging the arm 112 and sheave 114 forwardly to bring the latter into engagement with the end of the push rod 210. To provide for adjusting this point of engagement, the contact element 212 in the form of a screw is threaded into the end of the push rod and locked in place by a nut 213.

At its other end the push rod 201 is pivotally connected by a pin 214 to one arm of a rocker member 215 pivotally secured by a pin 216 on an extension of the bracket 193. The other arm of the rocker bears against the projecting end of the valve stem 200, as shown in Figs. 4 and 5. It will be apparent therefore that the forward movement of the push rod resulting from engagement of the sheave 114 therewith will shift the valve stem 200 in a direction to unseat the valve member 202. Such unseating of the valve member initiates full opening of the release valve as previously described. Since a mere "cracking" of the release valve is effective to initiate its full opening by the action of the fluid vented from the main valve chamber, it will be appreciated that the release valve is adapted to respond very quickly to the occurrence of an overload.

When the improved overload release valve is utilized in a tractor organization of the type herein disclosed, the vented oil may be utilized advantageously to lubricate various elements of the power operating system and associated controls. For this purpose the valve is mounted so that its discharge end projects rearwardly of the ram cylinder and with the vent port 199 facing generally upwardly as shown in Figs. 3 and 4. Under conditions which bring about the opening of the release valve, the oil of the system may be under relatively high pressure. As the valve opens the oil in passing out of the valve chamber and through the vent port 199 is broken up into a fine spray and effectively distributed over the various elements enclosed in the housing 29.

It will be apparent from the foregoing that the invention provides overload release mechanism of a novel and advantageous character for tractors equipped with the Ferguson system or like system of draft control. The mechanism is characterized by its simplicity, as well as by its quick and certain response. The tractor and associated parts of the system are thus effectually protected against damage.

The novel overload release mechanism is of such character that its vent valve, which is normally held securely closed by the pressure of the fluid in the system, is automatically fully opened in response to an initial or partial opening or "cracking" of the valve. Only a slight movement of a draft responsive member is required to initiate operation of the release valve and full response is insured under all conditions. Moreover, the valve includes means for retaining it in open position until the pressure fluid supply to the actuator is interrupted, thus maintaining the actuator of the power system inoperative and preventing bucking or shuddering of the tractor. Resetting of the valve to restore the system to operation is effected automatically when the supply of pressure fluid to the actuator is terminated. The valve and associated operating elements require little space and mechanical latching elements which may get out of order and which are subject to wear are entirely eliminated.

I claim as my invention:

1. In a tractor having a hitch linkage and a control member shiftable in accordance with the draft force on the linkage, in combination, power-actuated means for lifting, supporting and lowering the linkage including a pressure fluid operated actuator and a pump for supplying pressure fluid thereto, normally closed valve means effective when opened to vent fluid from said actuator and thereby terminate the lifting or supporting effectiveness of said power-actuated means, piston means operatively connected with said valve means and positioned to be acted on by the vented fluid for maintaining said valve means open, other valve means operable in response to the normal shifting of the control member for regulating the flow of pressure fluid to or from said actuator, and mechanism operable in response to the shifting of the control member in its normal range for actuating said other valve means and operable in response to the shifting of the control member beyond its normal range for opening said first-mentioned valve means.

2. In a tractor having a hitch linkage and a control member shiftable in accordance with the draft force on the linkage, in combination, power-actuated means for lifting, supporting and lowering the linkage including a pressure fluid operated actuator and a pump for supplying pressure fluid thereto, normally closed valve means effective when opened to vent fluid from said actuator and thereby terminate the lifting or supporting effectiveness of said power-actuated means, piston means operatively connected with said valve means and positioned to be acted on by the fluid vented upon partial opening of said valve means for fully opening the valve, other valve means operable in response to the normal shifting of the control member for regulating the flow of pressure fluid to and from said actuator, and mechanism operable in response to the shifting of the control member beyond its normal range for partially opening said first-mentioned valve means, said piston means for fully opening the valve means being operative to maintain the valve means open as long as fluid is supplied to the actuator through said other valve means.

3. In a tractor having a hitch linkage and power-actuated means for lifting, supporting and lowering the linkage including a pressure fluid operated actuator and a pump for supplying pressure fluid thereto, in combination, release valve means effective when operated to vent fluid from the actuator and thereby terminate the lifting or supporting effectiveness of the power-actuated means, piston means associated with said release valve and operated by the fluid vented through the valve to maintain said release valve means operated as long as fluid is vented therethrough, other valve means for controlling the flow of pressure fluid to and from the actuator, mechanism for operating both said valve means including a control member shiftable in accordance with the draft force on the hitch linkage, said mechanism being effective to operate said other valve means in response to the shifting of said control member within predetermined limits and to initiate a partial operation of said release valve means in response to the shifting of said control member beyond said predetermined limits, said fluid operated means for maintaining the release valve operated being further effective to complete its operation upon such partial operation by said mechanism.

4. In a tractor having a hitch linkage and power-actuated means for lifting, supporting and lowering the linkage including a pressure fluid operated actuator and a pump for supplying pressure fluid thereto, in combination, release valve means effective when operated to vent fluid from the actuator and thereby terminate the lifting or supporting effectiveness of the power-actuated means, piston means associated with said release valve and operated by the fluid vented through the valve to maintain said release valve means operated as long as fluid is vented therethrough, other valve means for controlling the flow of pressure fluid to and from the actuator, mechanism for operating both said valve means including a control member shiftable in accordance with the draft force on the hitch linkage, said mechanism opearting only said other valve means while the shifting of said control member is confined within predetermined limits and operating said release valve means upon shifting of the control member beyond said predetermined limits, and spring means for closing said release valve means upon interruption of the supply of pressure fluid to the actuator.

5. In a tractor having a hitch linkage, in combination, power-actuated means for lifting, supporting and lowering the linkage including a pressure fluid operated actuator and a pump for supplying pressure fluid thereto, valve means operable in response to the draft force imposed on the hitch linkage to control the delivery of pressure fluid to and exhaust the pressure fluid from said actuator, normally closed valve means effective when opened to vent said actuator and thereby terminate its lifting or supporting effectiveness, draft responsive mechanism associated with said linkage operative to open said normally closed valve means when the draft load imposed on the linkage exceeds a predetermined value, and piston means actuated by the fluid vented from said actuator for maintaining said last-mentioned valve means open until the supply of pressure fluid to said actuator is interrupted.

6. In a tractor having a hitch linkage, in combination, power-actuated means for lifting, supporting and lowering the linkage including a pressure fluid operated actuator and a pump for supplying pressure fluid thereto, valve means operable in response to changes in the draft load imposed on the linkage to control the delivery of pressure fluid to and exhaust of pressure fluid from said actuator, normally closed valve means effective when opened to vent said actuator and thereby terminate its lifting or supporting effectiveness, draft responsive mechanism associated with said linkage operative when the draft load imposed on the linkage exceeds a predetermined value for partially opening said normally closed valve, and piston means operable by the fluid vented through the partially opened valve for fully opening the valve.

7. In a tractor having a hitch linkage, in combination, power-actuated means for lifting, supporting and lowering the linkage including a pressure fluid operated actuator and a pump for supplying pressure fluid thereto, valve means operable in accordance with the draft load imposed on the linkage to control the delivery of pressure fluid to and the exhaust of pressure fluid from said actuator, normally closed valve means effective when opened to vent said actuator and thereby terminate its lifting or supporting effectiveness, draft responsive mechanism associated with said linkage operative in response to a draft load exceeding a predetermined value for shifting said normally closed valve to open position and thereby initiate the venting of said actuator, and piston means subjected to the pressure of the fluid supplied through said valve when open for maintaining the valve in open position as long as the pressure fluid supply to the actuator is continued.

8. In a tractor having a hitch linkage, in combination, power-actuated means for lifting, supporting and lowering the linkage including a pressure fluid operated actuator and a pump for supplying pressure fluid thereto, a control member variably positioned in accordance with the draft load imposed on the linkage, valve means for controlling the delivery of pressure fluid to and the exhaust of pressure fluid from said actuator, manually operable means acting jointly with said control member to actuate said valve means, other valve means operable by said control member when the draft load imposed on the implement exceeds a predetermined value for venting said actuator to terminate the lifting or supporting effectiveness of said power-actuated means, and piston means for maintaining said other valve means operated, said valve means being effective to direct the vented pressure fluid to said piston means to actuate the same as long as the supply of pressure fluid to said actuator is continued.

9. A release valve for pressure fluid operated actuators comprising, in combination, a housing defining main and auxiliary chambers, said main chamber having direct communication with the actuator and communicating with said auxiliary chamber through an outlet, a valve member associated with said outlet having piston means normally urged in one direction to close the valve by the pressure of the fluid received in said main chamber from the actuator, means for shifting said valve member in the opposite direction to partially open said outlet, and other piston means in said auxiliary chamber having a substantially greater effective area than said first mentioned piston means operable upon the admission of fluid to the auxiliary chamber for further shifting said valve member in said opposite direction to fully open said outlet.

10. A release valve for pressure fluid operated actuators comprising, in combination, a housing defining main and auxiliary chambers, said main chamber having direct communication with the actuator and communicating with said auxiliary chamber through an outlet, a valve member associated with said outlet and normally urged in a direction to close the same by the pressure of the fluid received in said main chamber from the actuator, means for shifting said valve member to initiate a flow of fluid from said main chamber to said auxiliary chamber, a piston element in said auxiliary chamber operatively associated with said valve member and urged by the fluid admitted to the auxiliary chamber in a direction to maintain the valve member in open position, said auxiliary chamber having a vent port normally closed by said piston element and opened upon movement of the piston element to the valve opening position.

11. A release valve for pressure fluid operated actuators comprising, in combination, main and auxiliary valve chambers, said main chamber having an inlet port for receiving fluid under pressure and an outlet opening into said auxiliary chamber, a valve member shiftable to open and close said outlet, a piston in said main valve chamber operatively connected with said valve member urged by the pressure of the fluid received in said chamber in a direction to hold the member in closed position, means for shifting said valve member in a direction to partially open said outlet, a piston element working in said auxiliary chamber operative in response to the partial opening of said outlet to shift said valve member in a direction to further open said outlet and to maintain the valve member in open position as long as fluid is received from said main chamber, said auxiliary chamber having an auxiliary port controlled by said piston element for discharging the fluid received in that chamber, and spring means operative to return said valve means to closed position upon interruption of the supply of pressure fluid to said main valve chamber.

12. A valve comprising, in combination, a housing defining an elongated main chamber communicating at one end with an auxiliary chamber, a stem extending axially through said chambers, a valve member mounted on said stem within said auxiliary chamber and movable with the stem to close or open said one end of the main chamber, a piston element mounted on said stem and working in said main chamber, said piston element having an effective area substantially greater than the area of said valve member exposed to the pressure of the fluid in the main chamber and being operative to yieldably retain the stem and said valve member in position to close the main chamber, means for shifting said stem and said valve member to partially open position and thereby admit fluid from the main chamber into said auxiliary chamber, a flange on said valve member having a working fit in said auxiliary chamber, said flange having an effective area substantially greater than the area of the piston element and being operable upon admission of fluid to the auxiliary chamber to shift said stem and said valve member to full open position.

13. An overload relief valve for hydraulic actuators comprising, in combination, a housing defining a chamber in direct communication with the actuator and having a discharge opening at one end, a valve member movable toward and from said opening to control flow of fluid therethrough, a piston element in said chamber operatively connected with said valve member and urged by the pressure of the fluid in said chamber in a direction effective to hold the valve member in closed position, means defining an auxiliary chamber positioned to receive fluid from said valve chamber upon movement of said valve member out of closed position, said auxiliary chamber having a vent, and a piston element in said auxiliary chamber connected with said valve member and urged by the pressure of the fluid admitted to the auxiliary chamber in a direction effective to move said valve member toward open position and to open said vent, said last-mentioned piston element having a greater effective area than the piston element in said chamber to enable it to move the valve member to full open position following an initial movement of the member sufficiently to establish communication between the chambers.

14. A valve comprising a pair of communicating chambers of different cross-sectional areas, an auxiliary chamber communicating with the smaller of said pair of chambers, said auxiliary chamber having a cross-sectional area greater than the larger of said pair of chambers, a stem extending axially through said chambers, a member mounted on said stem within said auxiliary chamber having a head portion shiftable toward said small chamber to close the same from the auxiliary chamber, a flange on said member having a working fit in said auxiliary chamber, a piston element mounted on said stem and working in the larger of said pair of chambers, the pressure of the fluid in said pair of chambers urging said piston element in a direction to hold said valve member in closed position, means operable to move said valve member so as to admit pressure fluid into said auxiliary chamber, the fluid acting on said flange to further move said valve member toward open position, said auxiliary chamber having a vent port opened upon such further movement of the valve member to permit escape of fluid from the valve.

15. In a tractor having a hitch linkage, in combination, power-actuated means for lifting, lowering and supporting the linkage including a pressure fluid operated actuator and a pump for supplying pressure fluid thereto, valve means in control of the flow of fluid from said pump to said actuator, other valve means arranged when open to release fluid from said actuator in such volume as to prevent the establishment of an operative pressure head in said actuator even though the first-mentioned valve is set to supply fluid to the actuator, mechanism responsive to the draft load on the hitch linkage operative to open said other valve means when the draft load imposed thereon exceeds a predetermined value, and piston means supplied with pressure fluid through said other valve means for holding said other valve means open so long as the pressure head in the actuator exceeds a predetermined minimum.

16. A release valve for pressure fluid operated actuators comprising, in combination, a housing defining main and auxiliary chambers, said main chamber having direct communication with said actuator and communicating with said auxiliary chamber through an outlet, a valve member associated with said outlet and normally urged in a direction to close the same by the pressure of the fluid received in said main chamber from the actuator, means for shifting said valve member to initiate a flow of fluid from said main chamber to said auxiliary chamber, and a piston element in said auxiliary chamber operatively associated with said valve member and urged by the fluid admitted to the auxiliary chamber in a direction to shift said valve member toward fully open position, said auxiliary chamber having a vent port normally closed by said piston element and opened upon movement of the same toward open position, said piston element being spaced from said valve member so as to close said vent port before closure of said outlet upon a drop in pressure in the actuator and thereby introduce a delay in the final movement of the valve member to closed position.

17. In a tractor having a hitch linkage, in combination, power actuated means for lifting, lowering and supporting the linkage including a pressure fluid operated actuator and a pump for supplying pressure fluid thereto, valve means in control of the flow of fluid from said pump to said actuator, other valve means operative when open to release fluid from said actuator in such volume as to prevent establishment of an operative pressure head in the actuator, spring means yieldably biasing said other valve means toward a closed position, means responsive to the draft load on the hitch linkage operative to open said other valve means against the action of said spring means when the draft load imposed thereon exceeds a predetermined value, and fluid operated means supplied with fluid from said pump for retaining said other valve means in open position so long as the pressure head on the actuator exceeds a predetermined minimum value, said other valve means and said fluid operated retaining means being relatively positioned so as to delay return of the other valve means to closed position when the pressure head in the actuator falls below said predetermined minimum value.

References Cited in the file of this patent

UNITED STATES PATENTS

| Number | Name | Date |
|---|---|---|
| Re. 22,642 | Ferguson | May 15, 1945 |
| 1,644,265 | Noble | Oct. 4, 1927 |
| 1,661,973 | Shaffer et al. | Mar. 6, 1928 |
| 1,677,446 | Hartmetz | July 17, 1928 |
| 1,720,705 | Waterman | July 16, 1929 |
| 2,118,180 | Ferguson | May 24, 1938 |
| 2,118,181 | Ferguson | May 24, 1938 |
| 2,437,875 | Chambers et al. | Mar. 16, 1948 |
| 2,521,503 | Clark | Sept. 5, 1950 |